(12) United States Patent
Harvey (10) Patent No.: US 12,172,212 B2
(45) Date of Patent: Dec. 24, 2024

(54) BINDING AGENTS FOR PRINTING 3D GREEN BODY OBJECTS

(71) Applicant: Hewlett-Packard Development Company, L.P., Spring, TX (US)

(72) Inventor: Natalie Harvey, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 475 days.

(21) Appl. No.: 17/298,922

(22) PCT Filed: Jun. 7, 2019

(86) PCT No.: PCT/US2019/036068
§ 371 (c)(1),
(2) Date: Jun. 1, 2021

(87) PCT Pub. No.: WO2020/246990
PCT Pub. Date: Dec. 10, 2020

(65) Prior Publication Data
US 2022/0119653 A1    Apr. 21, 2022

(51) Int. Cl.
*C09D 11/023* (2014.01)
*B22F 1/10* (2022.01)
(Continued)

(52) U.S. Cl.
CPC ............... *B22F 10/14* (2021.01); *B22F 1/10* (2022.01); *B22F 1/103* (2022.01); *B22F 1/107* (2022.01); *B33Y 10/00* (2014.12); *B33Y 40/20* (2020.01); *B33Y 70/10* (2020.01); *C09D 11/023* (2013.01); *C09D 11/033* (2013.01);
(Continued)

(58) Field of Classification Search
CPC .. B22F 1/10; B22F 1/103; B22F 1/107; B22F 10/14; B22F 2304/10; B22F 2998/10; B22F 3/10; B29C 64/165; B33Y 10/00; B33Y 40/20; B33Y 70/10; C09D 11/023; C09D 11/033; C09D 11/037; C09D 11/107; C09D 11/322; Y02P 10/25
See application file for complete search history.

(56) References Cited

U.S. PATENT DOCUMENTS

2012/0184701 A1    7/2012    Kubo et al.
2015/0266239 A1    9/2015    Okamoto et al.
(Continued)

FOREIGN PATENT DOCUMENTS

CN    107311561 A    11/2017
CN    108456456 A    8/2018
(Continued)

*Primary Examiner* — Jenny R Wu
(74) *Attorney, Agent, or Firm* — HP Inc. Patent Department (57) ABSTRACT

The present disclosure relates to a binding agent for printing a 3D green body object. The binding agent includes from about 0.3 wt % to about 3 wt % multi-functional carboxylic acid having a weight average molecular weight range from about 100 MW to about 1,000 MW, from about 2 wt % to about 20 wt % a (meth)acrylic latex binder, from about 10 wt % to about 40 wt % solvent package including from about 3 wt % to about 40 wt % of a coalescing solvent, and from about 40 wt % to about 88 wt % water. The weight percentage ranges are based on total content of the binding agent.

11 Claims, 4 Drawing Sheets

(51) Int. Cl.
    *B22F 1/103*     (2022.01)
    *B22F 1/107*     (2022.01)
    *B22F 10/14*     (2021.01)
    *B33Y 10/00*     (2015.01)
    *B33Y 40/20*     (2020.01)
    *B33Y 70/10*     (2020.01)
    *C09D 11/033*     (2014.01)
    *C09D 11/037*     (2014.01)
    *C09D 11/107*     (2014.01)
    *C09D 11/322*     (2014.01)

(52) U.S. Cl.
    CPC .......... *C09D 11/037* (2013.01); *C09D 11/107* (2013.01); *C09D 11/322* (2013.01); *B22F 2304/10* (2013.01)

(56) References Cited

U.S. PATENT DOCUMENTS

| | | |
|---|---|---|
| 2016/0333153 A1 | 11/2016 | Hirata et al. |
| 2019/0111479 A1 | 4/2019 | Kasperchik et al. |
| 2019/0111615 A1 | 4/2019 | Rodgers et al. |
| 2019/0111618 A1 | 4/2019 | Saito et al. |
| 2021/0213532 A1* | 7/2021 | Kowalski ............... B33Y 70/10 |

FOREIGN PATENT DOCUMENTS

| | | |
|---|---|---|
| DE | 102015105993 A1 | 10/2016 |
| EP | 1841381 B1 | 3/2013 |
| WO | WO-2007039450 A1 | 4/2007 |
| WO | WO-2017201308 A1 | 11/2017 |

* cited by examiner

BINDING AGENTS FOR PRINTING 3D GREEN BODY OBJECTS

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

An example 3-dimensional (3D) printing process can be an additive process that can involve the application of successive layers of build material with chemical binders or adhesives printed thereon to bind the successive layers of build materials together. In some processes, thermal fusing, melting, sintering, or the like can be utilized to form a green body object and then a sintered metal three-dimensional physical object. More specifically, a binder fluid can be selectively applied to a layer of particulate build material on a build platform to pattern a selected region of the layer and then another layer of the particulate build material is applied thereon. The binder fluid can be applied to another layer of the particulate build material and these processes can be repeated to form a green body object (also known as a green part) of the 3D printed object that is ultimately formed. The binder fluid can be capable of penetrating the layer of the particulate build material onto which it is applied, and/or spreading around an exterior surface of the particulate build material and filling void spaces between particles of the particulate build material. The binder fluid can include a binder that can hold the particulate build material of the green body object together. In some 3D printing methods, the binder fluid can include latex which can be adhered to the particulate build material, upon coalescence and give the green body object structural integrity. The green body object can be moved to a sintering oven, or another sintering device and exposed to heat to sinter the particulate build material of the green body object together and form the 3D printed object. Strengthening the green body object prior to sintering can provide for structural integrity of the green body object, particularly during transfer, which may in some instances, allow for automated part extraction and/or transfer.

In accordance with examples of the present disclosure, a binding agent for printing a 3D green body object can include from about 0.3 wt % to about 3 wt % multi-functional carboxylic acid having a weight average molecular weight range from about 100 MW to about 1,000 MW, from about 2 wt % to about 20 wt % a (meth)acrylic latex binder, from about 10 wt % to about 40 wt % solvent package including from about 3 wt % to about 40 wt % of a coalescing solvent, and from about 40 wt % to about 88 wt % water. The multi-functional carboxylic acid can include multiple functional groups that are separated from one another, such as when the multi-functional carboxylic acid includes a carboxylic acid that is directly attached to a first carbon atom of aromatic ring, the carboxylic acid separated from any second functional group directly attached to a second carbon atom of the aromatic ring by a third carbon atom of the aromatic ring. Separation can also be present when the multi-functional carboxylic acid positioned along an organic chain that is not aromatic, there is at least one carbon atom between the carboxylic acid and any second functional group. Weight percentage ranges in this example are based on total content of the binding agent. In one example, the second multi-functional group can be a second carboxylic acid, and in another example, the second multi-functional group can be an amine. In another example, the multi-functional carboxylic acid is present at from about 0.5 wt % to about 2.5 wt %. In yet another example, the binding further includes a colorant. In yet another example, the coalescing solvent includes a C3 to C8 aliphatic diol. In a further example, the coalescing solvent has a boiling point temperature ranging from about 100° C. to about 300° C. In one other example, the (meth)acrylic latex binder has an average particle size from about 10 nm to about 300 nm.

In another example, a three-dimensional printing kit can include a particulate build material including from about 80 wt % to 100 wt % metal particles based on the total weight of the particulate build material and a binding agent. The binding agent can include water, from about 0.3 wt % to about 3 wt % multi-functional carboxylic acid having a weight average molecular weight range from about 100 MW to about 1,000 MW based on total content of the binding agent, and from about 2 wt % to about 20 wt % a (meth)acrylic latex binder based on total content of the binding agent. In one example, the metal particles include aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, or an admixture thereof. In another example, the metal particles have a D50 particle size distribution value of from about 4 μm to about 150 μm. In yet another example, the multi-functional carboxylic acid includes from 2 to 5 carboxylic acid functional groups. In a further example, the binding agent includes from 3 wt % to 40 wt % coalescing solvent based on total content of the binding agent.

In another example, a method for three-dimensional printing can include iterative applying individual build material layers of a particulate build material which includes from about 80 wt % to 100 wt % metal particles based on the total weight of the particulate build material; and further, based on a 3D object model, selectively applying a binding agent to individual build material layers to define individually patterned layers of a 3D green body object. The method can also include heating the individually patterned layers of the 3D green body object to drive off water and further solidify the 3D green body object. The binding agent can include water, from about 0.3 wt % to about 3 wt % multi-functional carboxylic acid having a weight average molecular weight range from about 100 MW to about 1,000 MW based on total content of the binding agent, and from about 2 wt % to about 20 wt % a (meth)acrylic latex binder based on total content of the binding agent. In one example, selectively applying the binding agent can occur by ejecting the binding agent from an inkjet printhead onto metal particles, where the quantity of (meth)acrylic latex binder ranges from 1 gsm/layer of metal powder to about 3 gsm/layer of metal powder for a metal layer thickness ranging from 30-100 μm; and heating of the individually patterned layers of the 3D green body object occurs at a temperature ranging from about 70° C. to about 250° C. In another example, the method further includes separating the 3D green body object from the particulate build material and sintering the metal particles of the 3D green body object in a fusing oven.

It is noted that when discussing the binding agent for printing a 3D green body object, a three-dimensional printing kit, and method for three-dimensional printing herein, such discussions can be considered applicable to one another whether or not they are explicitly discussed in the context of that example. Thus, for example, when discussing a multi-functional carboxylic acid in the context of a binding agent, such disclosure is also relevant to and directly supported in the context of the three-dimensional printing kit and/or the method for three-dimensional printing, and vice versa. It is also understood that terms used herein will take on their ordinary meaning in the relevant technical field unless specified otherwise. In some instances, there are terms defined more specifically throughout the specification or included at the end of the present specification, and thus, these terms have a meaning consistent with these more specific definitions.

Binding Agent

Figure 1:
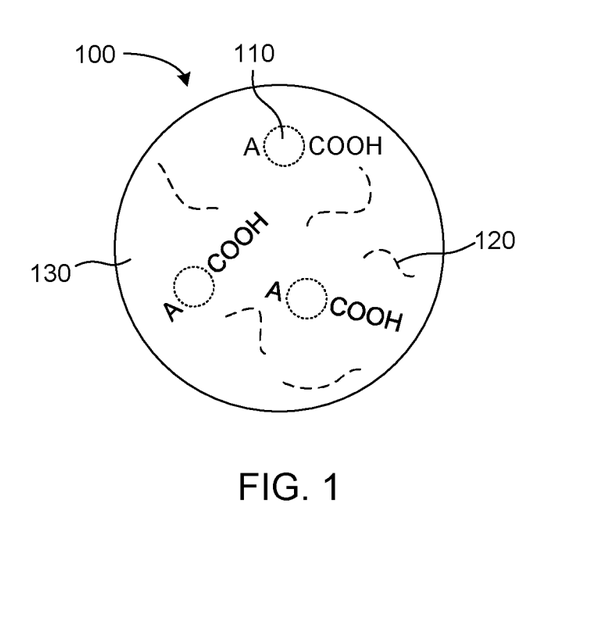
FIG. 1 graphically illustrates a schematic view of an example binding agent for printing a 3D green body object in accordance with the present disclosure.

To bind particulate build material together during the build process and form a green body object, a binding agent can be applied to the particulate build material on a layer by layer basis. In some instances, heat (below a sintering temperature of the particulate build material) can be applied on a layer by layer basis. Upon formation of a plurality of layers of the green body object can be fully formed. The binding agent 100 can include, for example, from about 0.3 wt % to about 3 wt % multi-functional carboxylic acid 110 having a weight average molecular weight range from about 100 MW to about 1,000 MW, from about 2 wt % to about 20 wt % a (meth)acrylic latex binder 120, from about 10 wt % to about 40 wt % solvent package including from about 3 wt % to about 40 wt % of a coalescing solvent, and from about 40 wt % to about 88 wt % water. See FIG. 1 as an example of a binding agent 100, which includes a multi-functional carboxylic acid 110 and a (meth)acrylic latex 120. The multi-functional carboxylic acid is represented schematically with one carboxylic acid group (COOH) and a second functional group (A). The (meth)acrylic latex is also represented schematically with a dashed line, but would typically be in the general shape of (meth)acrylic polymer particulates. The solvent package, coalescing solvent, and water are illustrated collectively as liquid vehicle 130. Weight percentage ranges are based on total content of the binding agent.

In further detail, the multi-functional carboxylic acid as used herein, refers to a carboxylic acid containing more than one functional group. In one example, the functional group can include more than one carboxyl functional group. In yet other examples, the multi-functional carboxylic acid can include a carboxylic functional group and a functional group of another type. For example, a multifunctional carboxylic acid can include a carboxyl functional group and an amino functional group. In some examples, the multi-functional carboxylic acid can include from 2 to 4, from 2 to 5, or from 3 to 8 functional groups. In another example, the multi-functional carboxylic acid can include from 2 to 4, from 2 to 5, or from 3 to 8 carboxyl functional groups. The carboxylic acid functional groups can be positioned as sidechains on a carbon backbone chain and can be separated from one another by a carbon on the backbone chain that excludes a carboxylic acid functional group. In yet other examples, the carboxylic acid functional groups can be positioned as sidechains on a carbon backbone chain and can be separated from one another by a carbon on the backbone chain that excludes any functional groups.

The multi-functional carboxylic acid can have a weight average molecular weight that can range from about 100 MW to about 1,000 MW. In yet other examples, the multi-functional carboxylic acid can have a weight average molecular weight that can range from about 200 MW to about 800 MW. In a further example, the multi-functional carboxylic acid can have a weight average molecular weight that can range from about 150 MW to about 500 MW. The multifunctional carboxylic acid can include straight chain components, aromatic moieties, or can include a mixture of straight chain components and aromatic moieties. In some examples the multi-functional carboxylic acid can be selected from 1,3,5-benzenetricarboxylic acid; L-arginine; isophthalic acid; histidine; lysine; aspartic acid; glutamic acid; glutamine; or a combination thereof.

The multi-functional carboxylic acid can be present in the binding agent from about 0.3 wt % to about 3 wt %. In yet other examples, the multi-functional carboxylic acid can include from about 0.5 wt % to about 2.5 wt %, from about 1 wt % to about 3 wt %, or from about 0.5 wt % to about 1.5 wt %. It is believed that the multi-functional carboxylic acid can coordinate with a metal surface of a particulate build material.

The (meth)acrylic latex binder can include an acrylate or methacrylate latex binder. The term "(meth)acrylic" or "(meth)acrylate" refers to monomers, copolymerized monomers, functional moieties of a polymer, etc., include both examples of an acrylate or methacrylate (or a combination of both), or acrylic acid or methacrylic acid (or a combination of both), as if independently listed or enumerated. When referring to "acrylic" versus "acrylate," for example, it is understood that it can be in the acid form or the salt form, which may typically merely be a function of pH.

The (meth)acrylic latex binder can include polymer particles made from (A) a co-polymerizable surfactant and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In one example, the (meth)acrylic latex binder can include 2-phenoxyethyl methacrylate, cyclohexyl methacrylate, cyclohexyl acrylate, methacrylic acid, or a combination thereof.

In one example, the (meth)acrylic latex binder can include particles that can have an average particle size from about 10 nm to about 300 nm. In yet another example, the (meth) acrylic latex binder can include particles that can have an average particle size from about 50 nm to about 250 nm. In yet other examples, the (meth)acrylic latex binder can include particles that can have an average particle size that can range from about 20 nm to 200 nm. As used herein, "particle size" refers to the diameter of spherical particles, or to the longest dimension of non-spherical particles. Particle size can be measured by differential light scattering (DLS) or particle sizing via microscopic observation.

The (meth)acrylic latex binder can be present in the binding agent at from about 2 wt % to about 20 wt %. In yet other examples, the (meth)acrylic latex binder can be present at from about 5 wt % to about 20 wt %, at from about 10 wt % to about 15 wt %, or from about 8 wt % to about 18 wt %. A chain of the (meth)acrylic latex binder can entangle at elevated temperatures and can provide stability to a particulate build material.

The binding agent can include from about 10 wt % to about 40 wt % solvent package for carrying the multi-functional carboxylic acid and the (meth)acrylic latex binder. In some examples, the solvent package can be present at from about 15 wt % to about 30 wt % or from about 12 wt % to about 36 wt %. In one example, the solvent can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the solvent package can include primary aliphatic alcohols, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl-1,3-propanediol, and combinations thereof.

The solvent package can include from about 3 wt % to about 40 wt % of a coalescing solvent, based on a total content of the binding agent. In yet other examples the coalescing solvent can be present at from about 10 wt % to about 30 wt %. The coalescing solvent can be a high volatile solvent. As used herein, "high volatile solvent" refers to a solvent that has a boiling point temperature ranging from about 100° C. to about 300° C. In one example, the coalescing solvent can include a C3 to C8 aliphatic diol, e.g., propanediol, butanediol, pentanediol, hexandiol, heptanediol, octanediol, etc. In another example, the coalescing solvent can include any organic solvent that provides coalescence to the particulate build material in forming the green body object, such as propyleneglycol ether, 2-pyrrolidinone, and some of the other solvents listed previously. In one example, the coalescing solvent can be 1,2 butanediol. The coalescing solvent can act as a coalescing agent for the (meth) acrylic latex binder and can permit softening of the (meth)acrylic latex binder thereby allowing for chain entanglement.

The binding agent can further include water. Water can be present in the formulation at from about 40 wt % to about 88 wt %, from about 50 wt % to about 75 wt %, or from about 45 wt % to about 80 wt %, based on a total weight of the binding agent. In one example, the water can be deionized.

In some examples, the binding agent can further include a surfactant. The surfactant can include SURFYNOL® SEF, SURFYNOL® 104, or SURFYNOL® 440 (Evonik Industries AG, Germany); CRODAFOS™ N3 Acid or BRIJ® 010 (Croda International Plc., Great Britain); TERGITOL® TMN6, TERGITOL® 15S5, TERGITOL® 15S7, DOWFAX® 2A1, DOWFAX® 8390 (Dow, USA); DYNOL® (Evonik Industries, Germany), or a combination thereof. The surfactant or combinations of surfactants can be present in the binding agent at from about 0.1 wt % to about 5 wt % and in some examples, can be present at from about 0.5 wt % to about 2 wt %.

In other examples, the binding agent can further include a colorant. The colorant can be a dye or pigment. The quantity of colorant in the binding agent can vary based on the desired strength of the color. In some examples, a colorant can be present at from 0.1 wt % to about 5 wt % in the binding agent.

Three-Dimensional Printing Kit

Figure 2:
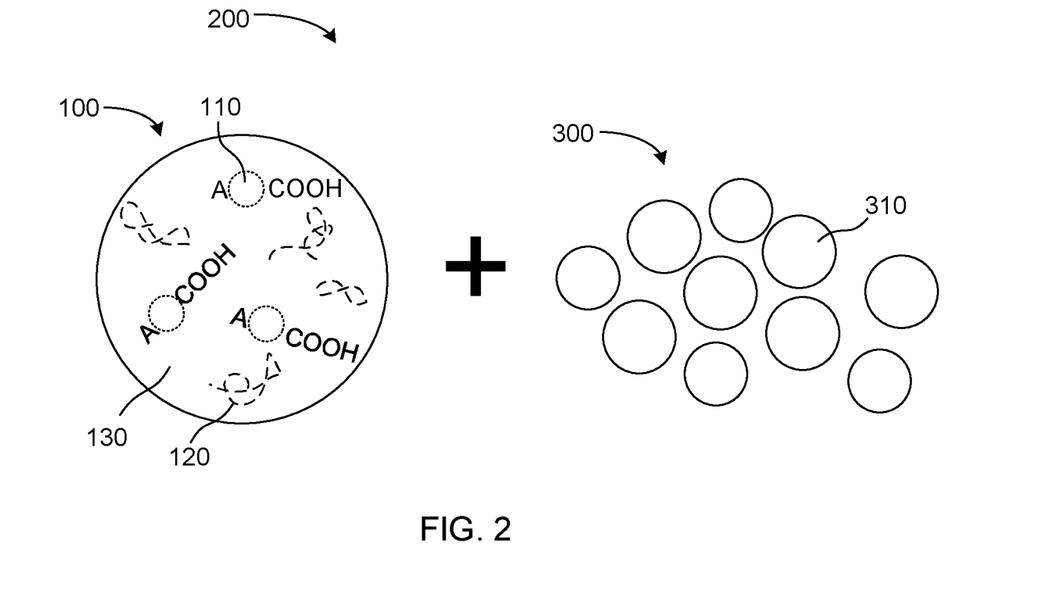
FIG. 2 graphically illustrates a schematic view of an example three-dimensional printing kit in accordance with the present disclosure.

In further detail, a three-dimensional printing kit 200 is shown at FIG. 2. The three-dimensional printing kit can include a particulate build material 300 including from about 80 wt % to about 100 wt % metal particles 310 based on the total weight of the particulate build material and a binding agent 100. The binding agent can include water, from about 0.3 wt % to about 3 wt % multi-functional carboxylic acid 110 having a weight average molecular weight range from about 100 MW to about 1,000 MW based on total content of the binding agent, and from about 2 wt % to about 20 wt % a (meth)acrylic latex binder 120 based on total content of the binding agent. The binding agent can be as described above.

The particulate build material can include from 80 wt % to 100 wt % metal particles based on the total weight of the particulate build material. In an example, the metal particles can be a single phase metallic material composed of one element. In this example, the sintering temperature may be below the melting point of the single element. In another example, the metal particles can be composed of two or more elements, which may be in the form of a single phase metallic alloy or a multiple phase metallic alloy. In these other examples, sintering generally can occur over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy stainless steel, steel, an alloy thereof, or admixture thereof.

The temperature(s) at which the metallic particles of the particulate build material sinter can be above the temperature of the environment in which the patterning portion of the 3D printing method is performed (e.g., patterning at from about 100° C. to about 250° C., and sintering at from about 500° C. to about 3,500° C.). In some examples, the metal particles may have a melting point ranging from about 500° C. to about 3,500° C. In other examples, the metal particles may be an alloy having a range of melting points.

The particle size of the particulate build material can be similarly sized or differently sized. In one example, the D50 particle size of the particulate build material can range from 4 µm to 150 µm. In some examples, the particles can have a D50 particle size distribution value that can range from about 25 µm to about 100 µm, or from about 50 µm to about 150 µm. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range.

Methods of Three-Dimensional Printing

Figure 3:
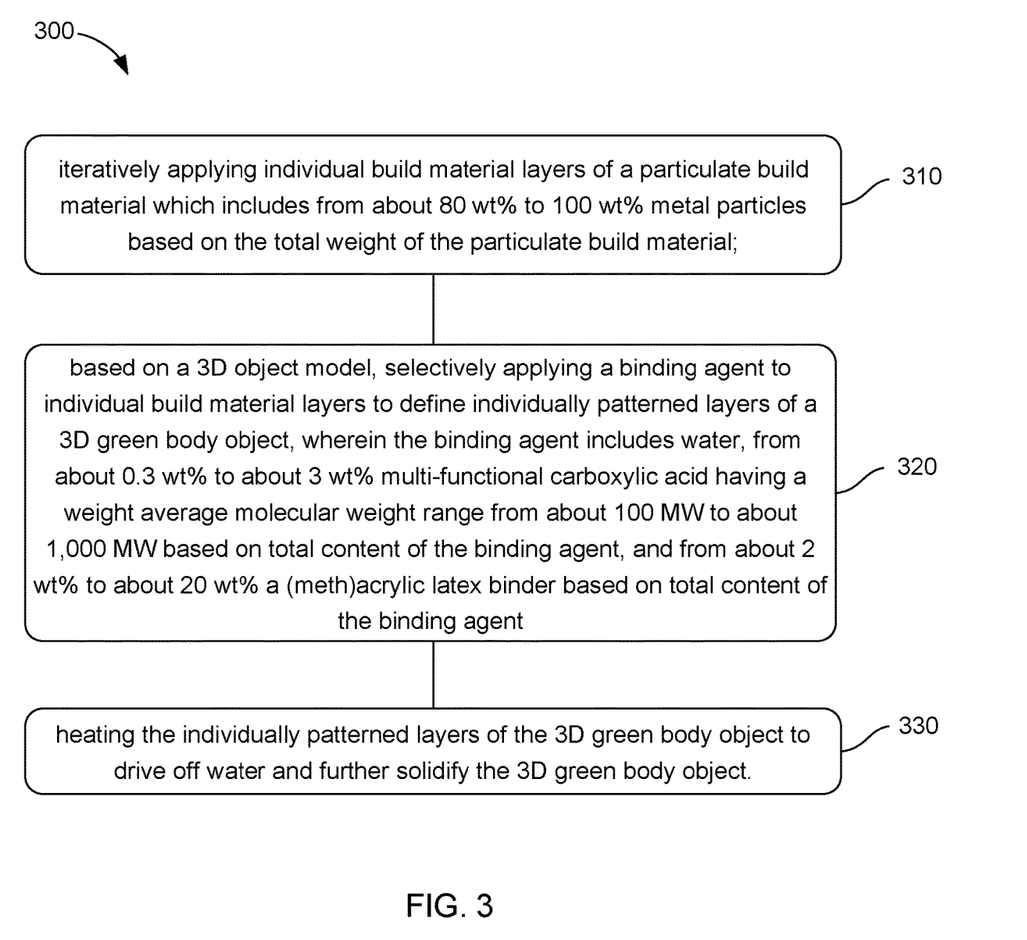
FIG. 3 is a graphically illustrates an example method of three-dimensional printing in accordance with the present disclosure.

In still another example, as shown in FIG. 3, a method 300 of three-dimensional printing can include iteratively applying 310 iteratively applying individual build material layers of a particulate build material 300 which includes from about 80 wt % to 100 wt % metal particles based on the total weight of the particulate build material. The method can further include, based on a 3D object model, selectively applying 320 a binding agent 100 to individual build material layers to define individually patterned layers of a 3D green body object, and heating 330 the individually patterned layers of the 3D green body object to drive off water and further solidify the 3D green body object.

Figure 4:
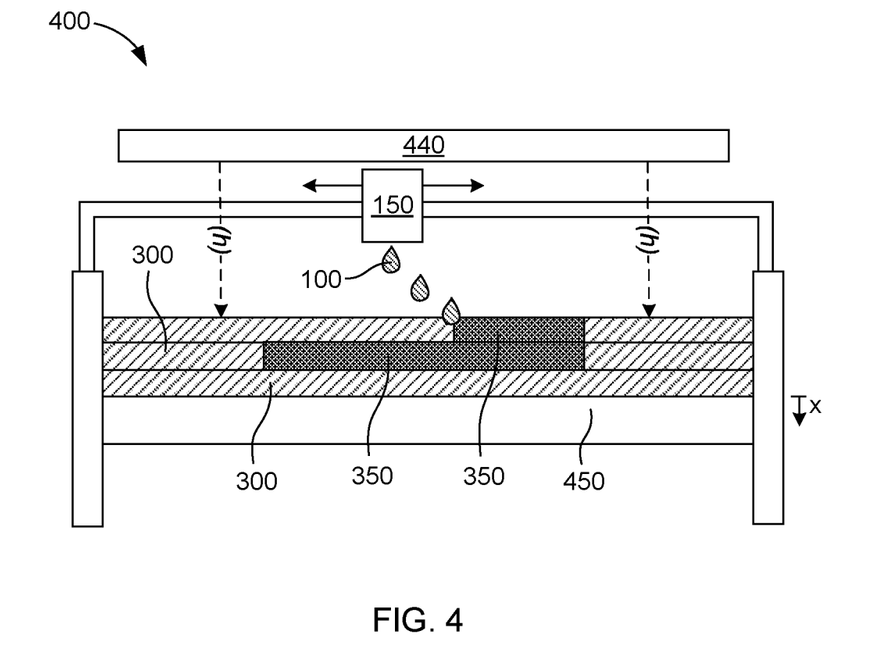
FIG. 4 is a flow diagram illustrating an example method of three-dimensional printing in accordance with the present disclosure.

In one example as illustrated in FIG. 4, the method can be carried out using a three-dimensional printing system 400 or apparatus. In that system, as shown, heat can be applied from a heat lamp 440 above a powder bed 450, and/or heat (h) can be provided by the powder bed, for example. The particulate build material 300 and binding agent 100 can be as described previously in FIGS. 1 and 2, for example. Upon fusion, a green body object 350 can be formed in a layer-by-layer process, where the build platform 450 is dropped (x) after each layer is formed, followed by the spreading of an additional powder layer thereon to continue the build, for example. In further detail, the particulate build material can be layered at a thickness that can range from about 50 µm to about 300 µm, for example. The respective layers can be patterned one layer at a time until the green body object is formed. The selective applying of the binding agent can occur by ejecting the binding agent from printhead 150 onto the metal particles, where the quantity of (meth)acrylic latex binder ranges from 1 gsm/layer of metal powder to about 3 gsm/layer of metal powder for a metal layer thickness ranging from 30-100 µm; and heating the individually patterned layers of the 3D green body object to drive off water and further solidify the 3D green body object.

Following application of the binding agent on the particulate build material, in some instances, the particulate build material having binding agent applied thereto can be heated to an elevated temperature to assist with solidifying the green body object. In one example, the heating of the individually patterned layers of the 3D green body object can occur at a temperature ranging from about 70° C. to about 250° C. The elevated temperature can be at or above the MFFT or the Tg of the (meth)acrylic latex binder. Heat can also or alternatively be applied to more rapidly remove solvent from the binding agent during individual layer formation. In some instances, the elevated temperature can be applied by a heated build platform; a heated particulate build material, e.g., preheated prior to dispensing; an overhead heating source, such as a heat lamp, e.g., an ultra-violet lamp or an infrared lamp; or a combination thereof.

Upon coalescing or otherwise binding of the particulate build material the 3D green body object can be separated from the particulate build material and moved to a heating device, such as a sintering or annealing oven. The eventual sintering temperature range can vary, depending on the material, but in one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can depend upon the particle size and period of time that heating occurs, e.g., at a high temperature for a sufficient time to cause particle surfaces to become physically merged or composited together). For example, a sintering temperature for stainless steel can be about 1400° C. and an example of a sintering temperature for aluminum or aluminum alloys can range from about 550° C. to about 620° C. In one example the sintering can be at a temperature ranging from about 500° C. to about 3,500° C. In another example, the temperature can range from about 600° C. to about 1,500° C., or from about 800° C. to about 1200° C. The sintering temperature can sinter and fuse the metal particles to form a printed 3D object.

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the phrase "green body object," green part," and "layered green body" refers to any intermediate structure prior to sintering, including a green 3D object or object layer(s). As a green body object, the particulate build material can be (weakly) bound together by one or more components of a binding agent. Typically, a mechanical strength of the green body object is such that it can be handled or extracted from a build platform to place in an annealing or sintering oven. It is to be understood that any build material that is not patterned with the binding agent is not considered to be part of the green body object, even if it is adjacent to or surrounds the green body object. For example, unprinted particulate build material acts to support the green body object while contained therein, but the particulate build material is not part of the green body object unless it is printed with binding agent that is used to generate a solidified part prior to annealing or sintering.

As used herein, the terms "3D part," "3D object," or the like, refer to the target 3D object that is being built. The 3D object can be referred to as a "sintered" 3D object, indicating it has been sintered, or a "green body object" or "green" 3D object, indicating it has been solidified, but not sintered.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates an example of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of a Binding Agent

Five differing binding agents for three-dimensional printing of a green body object and a comparative formulation that excluded the multi-functional carboxylic additive were prepared by mixing the components together in accordance with formulations indicated in Table 1, as follows:

TABLE 1

Binding Agent Formulations & Comparative Formulation

| Component | | Binding Agent Formulation (wt %) | Comparative Formulation (wt %) |
|---|---|---|---|
| 1,2-butanediol | Coalescing Solvent | 26 | 26 |
| TERGITOL ® TMN-6 | Surfactant | 0.9 | 0.9 |
| TERGITOL ® 15-S-7 | Surfactant | 0.9 | 0.9 |
| Multi-Functional Carboxylic Acid* | Adhesion Promoter | 0.68 | 0 |
| (Meth)acrylic latex binder | Binding Agent | 12 | 12 |
| Colored dye | Colorant | 0.4 | 0.4 |
| Water | Solvent | 59.12 | 59.8 |

TERGITOL ® is available from Sigma Aldrich (USA).
*The multi-functional carboxylic acid in each of the binding agent formulations was independently selected from L-phenylalanine; 1,2,4,5-benzenetetracarboxylic acid; 1,3,5-benzenetricarboxylic acid; L-arginine; and isophthalic acid.

Example 2—Evaluation of Green Body Object Strength

A 70 μm single layer of stainless steel, SS316L particles having a D50 particle size of ~8.5 μm was dispersed evenly on a substrate. Each of the formulations of Table 1 were selectively ejected from a thermal inkjet print head thereon to form a green body 3D object layer. The layering was repeated until a green body object in the form of a 134 mm×34 mm×8 mm bar was formed for each of the formulations. The green body object in the shape of a par was then heated 60 minutes at 150° C. to remove drive off water and further solidify the 3D green body object. The green body object was then transferred to a vacuum oven and the strength evaluated. The green body object's structural integrity was evaluated by 3 point bend testing in accordance with ASTM D790. The testing was evaluated in a Criterion Single Column Frame using 5 mm rollers at a 25 mm span. The preload slack was set to 0.5 N of force and the test was run at a strain rate of 0.165 (mm/mm)/min. The part was compressed until there was an 80% drop in load. The green body object strength per multi-functional carboxylic acid, adhesion promoter, in the binding agent compositions was as indicated in Table 2.

TABLE 2

Green Body Object Strength vs. Multi-Functional Carboxylic Acid

| Multi-Functional Carboxylic Acid ID | Green Body Object Strength (mPA) |
|---|---|
| Control Formulation - None | 5.6 |
| L-phenylalanine | 5.1 |
| 1,2,4,5-benzenetetracarboxylic acid | 5.0 |
| 1,3,5-benzenetricarboxylic acid | 6.8 |
| L-arginine | 7.1 |
| Isophthalic acid | 7.3 |

Figure 5:
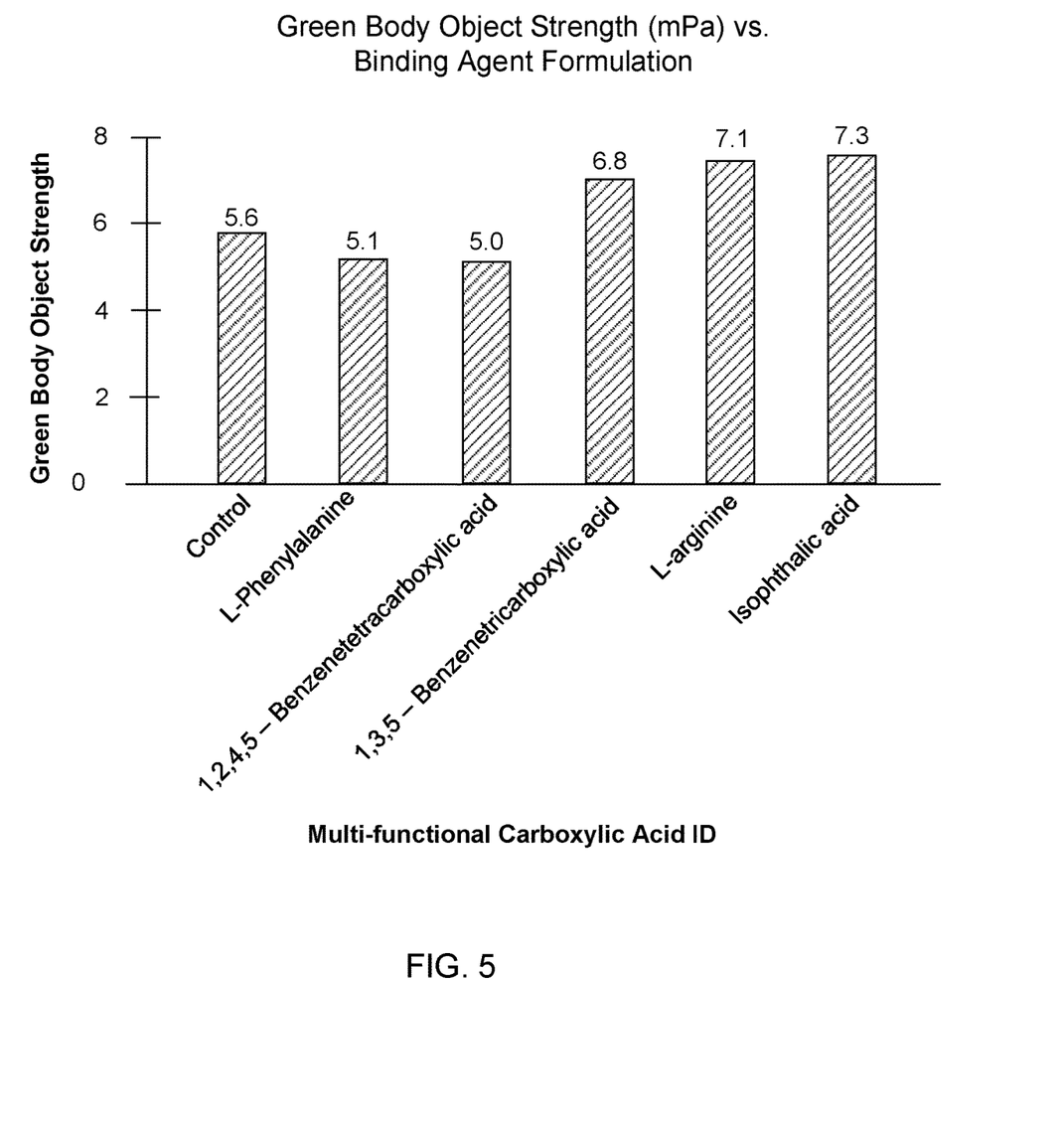
FIG. 5 is a bar diagram illustrating green part strength vs. multi-functional carboxylic acid in accordance with the present disclosure.

As shown above in Table 2 above and in FIG. 5, incorporating 1,3,5-benzenetricarboxylic acid; L-arginine; or isophthalic acid in the binding agent formulation improved green part strength; while incorporating L-phenylalanine or 1,2,4,5-benzenetetracarboxylic acid in the binding agent formulations decreased the green part strength when compared to the comparative formulation. Without being limited to theory it was believed that the location of the carboxylic acid functional groups on a backbone chain of the multi-functional carboxylic acid affected green body object strength. 1,2,4,5-benzenetetracarboxylic acid contains carboxylic acid functional groups on adjacent carbons of the backbone chain of the multi-functional carboxylic acid. L-phenylalanine contains a carboxylic acid functional group on a carbon of the backbone chain that is adjacent to a carbon on the backbone chain that includes an amino functional group. The location of functional groups on carbons directly adjacent to other carbons on the backbone chain that also include a functional group may create steric hindrance and/or permit intermolecular interaction, i.e. hydrogen binding between the functional groups; thereby preventing the carboxylic acid functional group from interacting with the metal particles of the particulate build material. In addition, 1,2,4,5-benzenetetracarboxylic acid included four carboxylic acid functional groups and exhibited the lowest green body object strength. Without being limited by theory it is further believed that the quantity of functional groups can also contribute to intermolecular interactions, which may indicate a reason for the part incorporating the 1,2,4,5-benzenetetracarboxylic acid to exhibit the lowest green body object strength.

Example 3—Green Body Object Strength with Arginine

Two binding agent formulations were created including different surfactants to determine the impact of a surfactant on green part strength. The formulations are the same as the formulation shown in Table 1 except the TERGITOL® surfactant was replaced with DYNOL® surfactant in one formulation. (TERGITOL® is available from Sigma Aldrich (USA) and DYNOL® is available from Evonik Industries (Germany)). Both of these formulations included arginine as the multi-functional carboxylic acid, both performed acceptably well even with the surfactant switched.

TABLE 3

Green Body Object Strength vs. Temp.

| Formulation | Green Body Object Strength (mPa) | |
| --- | --- | --- |
| | 150° C. | 180° C. |
| 1 - DYNOL® | 9.8 | 9.4 |
| 2 - TERGITOL® | 10 | 9.5 |

DYNOL® is available from Evonik Industries, Germany.
TERGITOL® is available from Sigma Aldrich (USA).

The binding agent formulations were tested for green body object strength using the methodology described in Example 2, except the heating temperatures were evaluated at 150° C. and 180° C. and the loading was set at 0.68%. The green body object strength was comparable in both formulations, with one performing slightly better at 150° C. and the other performing better at 180° C.

What is claimed is:

1. A binding agent for printing a 3D green body object, comprising:
    from about 0.3 wt % to about 3 wt % of a multi-functional carboxylic acid selected from the group consisting of 1,3,5-benzenetricarboxylic acid, L-arginine, isophthalic acid, histidine, lysine, aspartic acid, glutamic acid, glutamine, and a combination thereof;
    from about 2 wt % to about 20 wt % of a (meth)acrylic latex binder;
    from about 10 wt % to about 40 wt % of a solvent package, wherein the solvent package includes from about 3 wt % to about 40 wt % of a coalescing solvent; and
    from about 40 wt % to about 88 wt % of water,
    wherein weight percentage ranges are based on total content of the binding agent.

2. The binding agent of claim 1, further comprising a colorant.

3. The binding agent of claim 1, wherein the coalescing solvent includes a C3 to C8 aliphatic diol.

4. The binding agent of claim 1, wherein the coalescing solvent has a boiling point temperature ranging from about 100° C. to about 300° C.

5. The binding agent of claim 1, wherein the (meth)acrylic latex binder has an average particle size ranging from about 10 nm to about 300 nm.

6. A three-dimensional printing kit comprising:
    a particulate build material comprising from about 80 wt % to 100 wt % of metal particles based on the total weight of the particulate build material; and
    a binding agent comprising:
        from about 40 wt % to about 88 wt % of water;
        from about 0.3 wt % to about 3 wt % of a multi-functional carboxylic acid selected from the group consisting of 1,3,5-benzenetricarboxylic acid, L-arginine, isophthalic acid, histidine, lysine, aspartic acid, glutamic acid, glutamine, and a combination thereof; having a weight average molecular weight range
        from about 2 wt % to about 20 wt % a (meth)acrylic latex binder; and
        from about 10 wt % to about 40 wt % of a solvent package, wherein the solvent package includes from about 3 wt % to about 40 wt % of a coalescing solvent,
        wherein weight percentage ranges are based on total content of the binding agent.

7. The three-dimensional printing kit of claim 6, wherein a metal of the metal particles is selected from the group consisting of aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, and an admixture thereof.

8. The three-dimensional printing kit of claim 6, wherein the metal particles have a D50 particle size distribution value of from about 4 μm to about 150 μm.

9. A method of three-dimensional printing, comprising:
    iteratively applying individual build material layers of a particulate build material which includes from about 80 wt % to 100 wt % metal particles based on the total weight of the particulate build material;
    based on a 3D object model, selectively applying a binding agent to individual build material layers to define individually patterned layers of a 3D green body object, wherein the binding agent includes:
        from about 40 wt % to about 88 wt % of water;
        from about 0.3 wt % to about 3 wt % multi-functional carboxylic acid selected from the group consisting of 1,3,5- benzenetricarboxylic acid, L-arginine, isophthalic acid, histidine, lysine, aspartic acid, glutamic acid, glutamine, and a combination thereof;
        from about 2 wt % to about 20 wt % a (meth)acrylic latex binder; and
        from about 10 wt % to about 40 wt % of a solvent package, wherein the solvent package includes from about 3 wt % to about 40 wt % of a coalescing solvent,
        wherein weight percentage ranges are based on total content of the binding agent; and
    heating the individually patterned layers of the 3D green body object to drive off water and further solidify the 3D green body object.

10. The method of three-dimensional printing of claim 9, wherein:
- the selectively applying of the binding agent occurs by ejecting the binding agent from an inkjet printhead onto the metal particles, wherein the quantity of (meth) acrylic latex binder ranges from 1 gsm/layer of metal powder to about 3 gsm/layer of metal powder for a metal layer thickness ranging from 30 μm to 100 μm; and
- the heating of the individually patterned layers of the 3D green body object occurs at a temperature ranging from about 70° C. to about 250° C.

11. The method of three-dimensional printing of claim 9, further comprising separating the 3D green body object from the particulate build material and sintering the metal particles of the 3D green body object in a fusing oven.

* * * * *